No. 803,238. PATENTED OCT. 31, 1905.
M. N. LYNN.
WATER FILTER.
APPLICATION FILED MAR. 27, 1905.

2 SHEETS—SHEET 1.

Witnesses.
Inventor:
Mirabeau Norman Lynn,

UNITED STATES PATENT OFFICE.

MIRABEAU NORMAN LYNN, OF CINCINNATI, OHIO, ASSIGNOR TO THE LYNN FILTER MANUFACTURING COMPANY, OF CINCINNATI, OHIO, A CORPORATION OF OHIO.

WATER-FILTER.

No. 803,238.     Specification of Letters Patent.     Patented Oct. 31, 1905.

Application filed March 27, 1905. Serial No. 252,217.

*To all whom it may concern:*

Be it known that I, MIRABEAU NORMAN LYNN, a citizen of the United States, residing at Cincinnati, in the county of Hamilton and State of Ohio, have invented certain new and useful Improvements in Water-Filters, of which the following is a specification.

My invention relates to water-filters of the character in which the water to be filtered is passed through the filtration stone or medium under pressure, usually the pressure of a city or other water service, the filtration stone or medium usually being the natural stone or composition formed, baked, or made in imitation thereof or for serving a similar function. Filters of this character are known in the trade as "stone-filters," the filtering medium thereof being self-contained, needing no outer support for holding the mass in shape.

It is the object of my invention to provide a water-filter capable of having a maximum filtering-surface within a minimum compass; and it is the further object of my invention to so construct a filter as to arrange the filtering-stones or other filtering mediums thereof in novel manner for increasing its filtration capacity; and my invention consists in arranging hollow filtration bodies or cylinders one in the other, in providing such filtration bodies or cylinders so arranged with interspace for unfiltered water therebetween, and in providing the walls of said hollow filtration bodies or cylinders with longitudinal cores or apertures for receiving the filtered water, which latter passes transversely through said walls from said interspaces to said cores or apretures; and the invention will be further readily understood from the following description and claims, and from the drawings, in which—

Figure 1:
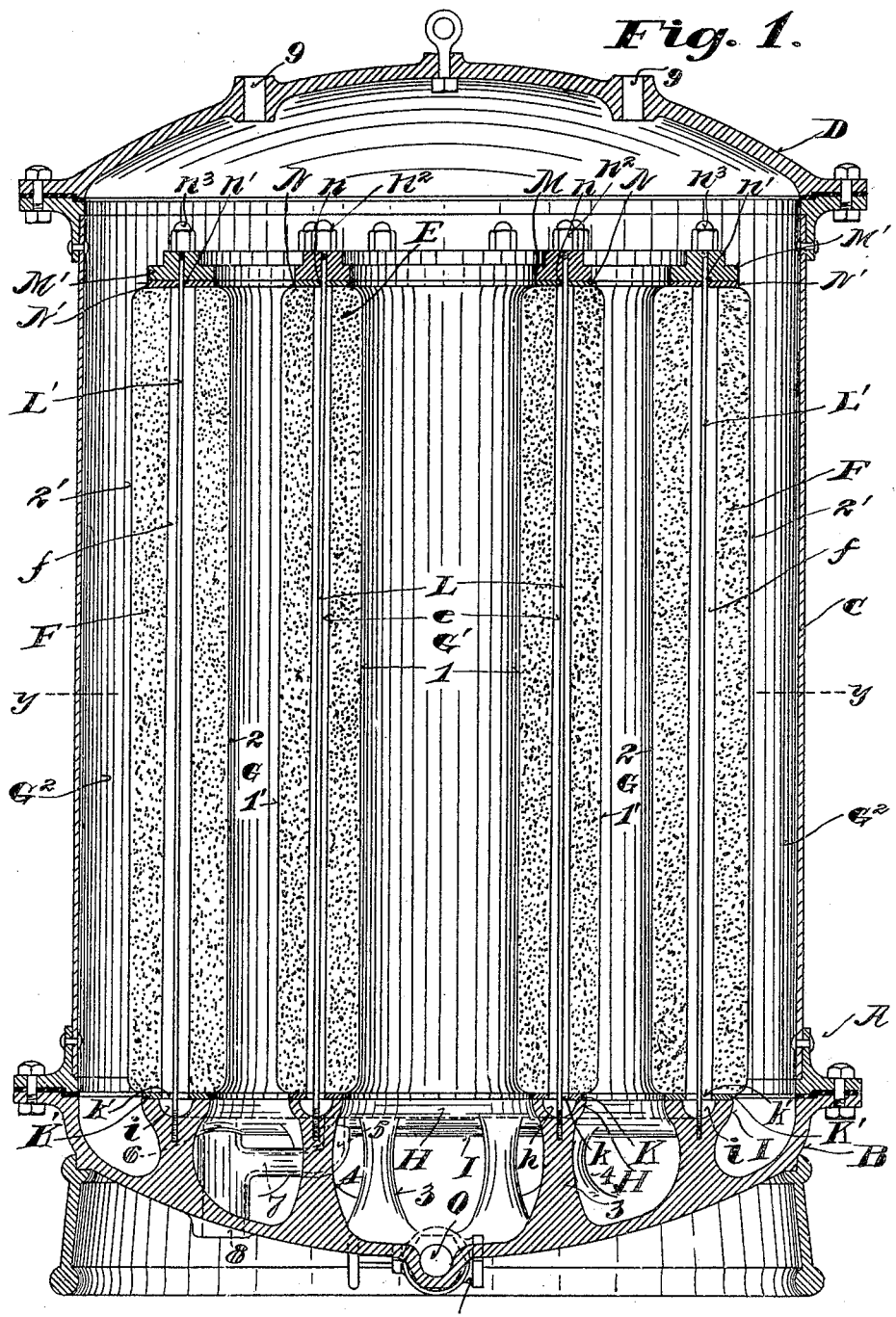
Figure 2:
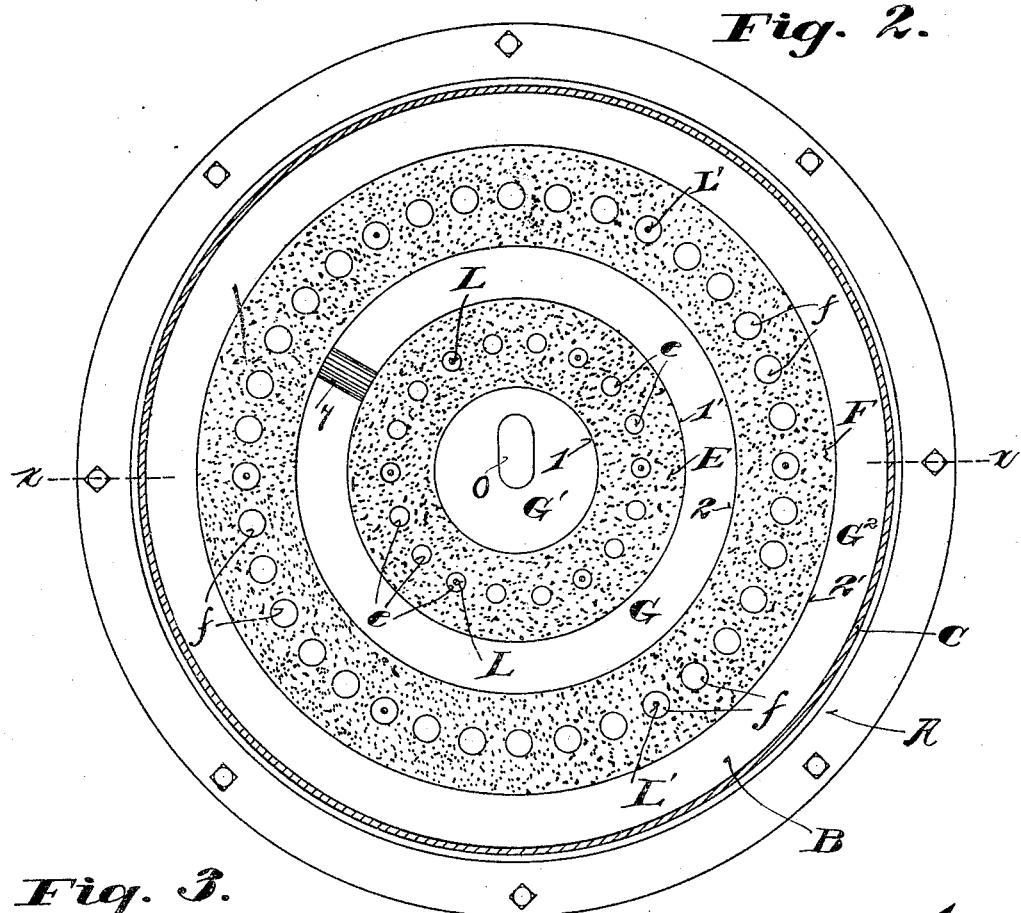
Figure 3:
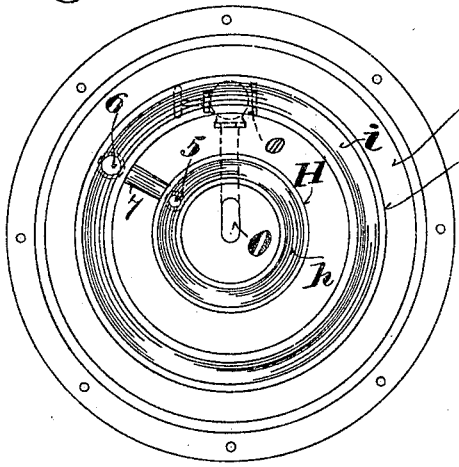
Figure 4:
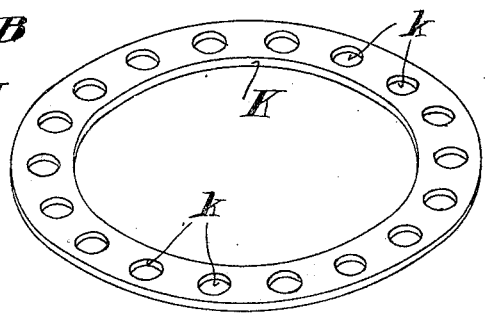

Figure 1 is a central longitudinal section of my improved device, taken on a line corresponding to the line $x\ x$ of Fig. 2. Fig. 2 is a cross-section of the same on the line $y\ y$ of Fig. 1. Fig. 3 is a plan view of the base of the casing, and Fig. 4 is a perspective view of one of the perforated gaskets.

A represents the casing, which may be of any suitable form, but which I prefer to comprise a base B, barrel C, and cap D, suitably secured together.

Within the casing suitable hollow bodies or cylinders of filtering-stone, composition, or similar material are disposed one in the other. Thus I have shown an inner filtering-cylinder E and an outer filtering-cylinder F. I prefer to arrange the cylinders concentrically with relation to each other. The walls of said filtering bodies or cylinders form the filtering medium, and said filtering bodies or cylinders have interspace G therebetween, into which the unfiltered water takes, the unfiltered water also taking into the inner space $G'$ in the inner cylinder and the outer space $G^2$ between the outer cylinder and wall of the casing. Each of these cylinders may have its wall provided with internally-disposed longitudinal cores or apertures, as shown at $e\ f$, these longitudinal apertures providing the passage into which the filtered water is received and from which it is led to a suitable point for use, the unfiltered water taking against the respective inner and outer surfaces 1 1' 2 2' of the walls of the filtering-cylinders and the water being filtered passing transversely through said bodies into said internal longitudinal apertures.

For supporting the filtering-cylinders I provide the base with supports H I, shown of annular form, respectively supported from the base on the pedestals 3 4. Grooves $h\ i$ are in the top of the respective supports for forming channels for the filtered water received from the respective apertures $e\ f$, and the respective grooves $h\ i$ may be tapped by passages 5 6, which passages may be connected by a passage 7, and the filtered water may be taken from the filter through a discharge-opening 8 in the filter-casing.

The water to be filtered is received through one or more supply-openings 9. These openings 8 and 9 may be provided with suitable valves. Gaskets K K' are interposed between the respective filtering-cylinders and their supports, the respective gaskets having openings $k\ k'$ registering with the apertures $e\ f$. Rods L L' are suitably secured to the respective supports H I, as by being threaded thereto, and take through selective apertures $e\ f$. Rings M M' are respectively placed above the cylinders, gaskets N N', having openings $n\ n'$ for the rods, being interposed between the respective rings and cylinders. Nuts $n^2\ n^3$ take over the respective rods and securely clamp the respective cylinders upon their respective supports. The gaskets form water-tight cushions for the cylinders and compel the filtered water in the longitudinal apertures in the cylinders to pass to their discharge-passages.

In cleaning the filter the water may be discharged through a flushing-opening O in the casing provided with a flushing-valve o. It will be noted that in my improved device the water to be filtered preferably takes against both faces of the walls of all the cylinders, fills the interspace between the cylinders, equalizes or balances the pressure against all the exposed surfaces of the cylinders, and causes the water-pressure to be exerted from both sides of the walls of the cylinders toward the filtered-water apertures in their interiors, the cylinders being disposed one in the other for having alternate filtered and unfiltered passages, thereby enabling the area of filtering-surface to be largely increased with a comparatively small increase in space occupied by the filter.

In the drawings I have shown two filtering-cylinders, one within the other; but it is obvious that their number may be increased without departing from the spirit of my invention. Filtering mediums of the character mentioned are usually fragile; but in my improved construction they are relieved of undue strain, the water-pressure upon both sides of the respective cylinders and between cylinders being equal.

Having thus fully described my invention, what I claim as new, and desire to secure by Letters Patent, is—

1. In a water-filter, the combination of a stationary base provided with a plurality of concentric filtered-water channels countersunk therein and forming stationary concentric walls for said concentric filtered-water channels, a plurality of concentric filtering-cylinders vertically above said plurality of concentric filtered-water channels and supported by and above said stationary base and stationary concentric walls, threaded apertures inside said casing in the bottoms of said channels, said concentric filtering-cylinders being provided with longitudinal filtered-water apertures communicating with said concentric filtered-water channels, rings inside said casing above said plurality of concentric filtering-cylinders, rods inside said casing screwed into said threaded apertures and taking through said longitudinal filtered-water apertures and rings, and means inside said casing on the upper ends of said rods for forcing said rings and concentric filtering-cylinders downwardly toward said base for securing the same in stationary position, substantially as described.

2. In a water-filter, the combination of a base provided with a plurality of concentric annular supports and with a plurality of concentrically-arranged rows of pedestals for said supports, said supports provided with concentric filtered-water channels countersunk therein and forming concentric walls for said filtered-water channels, a plurality of concentric filtering-cylinders vertically above said plurality of concentric filtered-water channels and supported by said concentric walls, said concentric filtering-cylinders being provided with longitudinal apertures communicating with said filtered-water channels, substantially as described.

In testimony whereof I have signed my name hereto in the presence of two subscribing witnesses.

MIRABEAU NORMAN LYNN.

Witnesses:
AUGUST F. HERBSLEB,
ARTHUR F. WEBER.